Patented Mar. 18, 1941

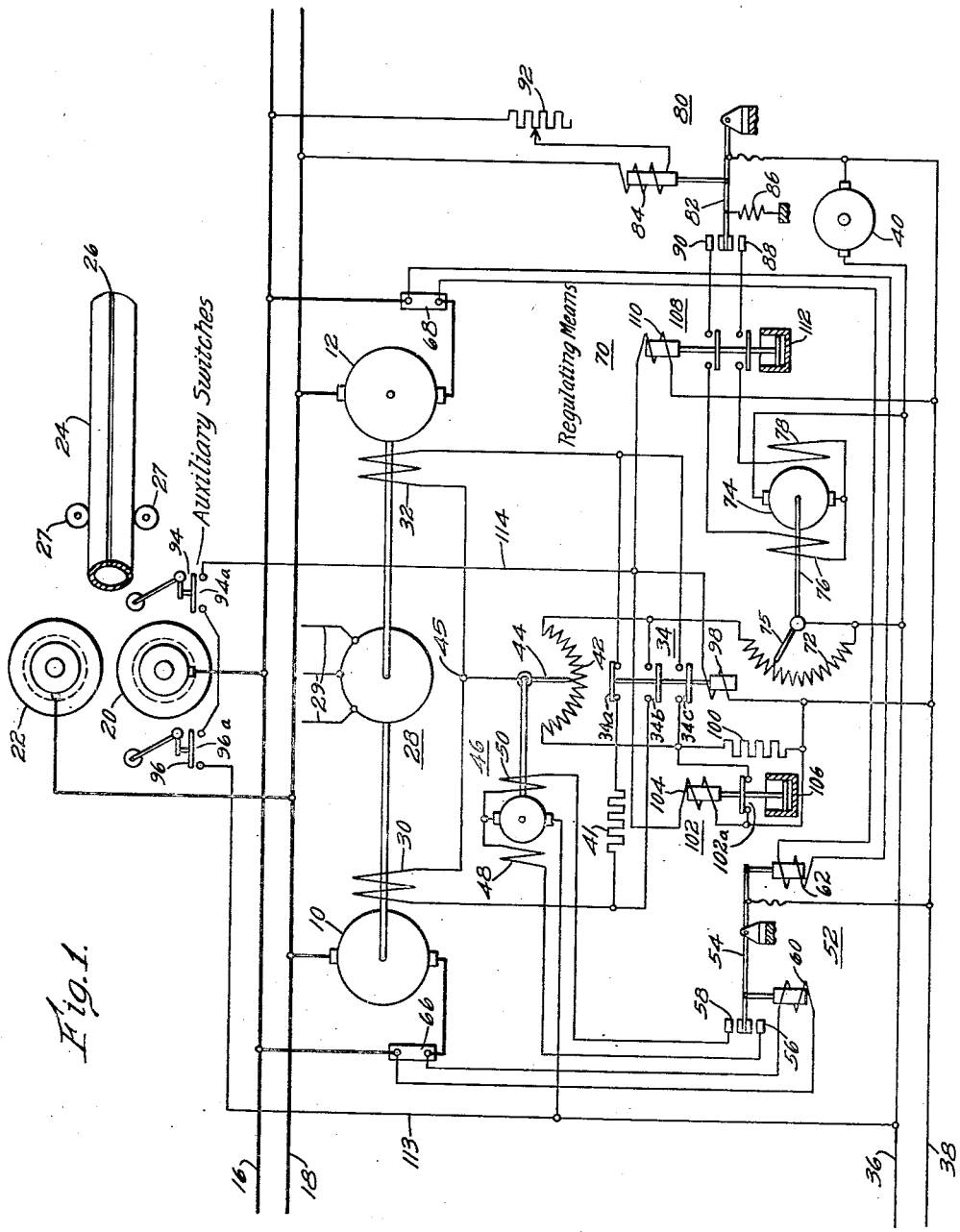

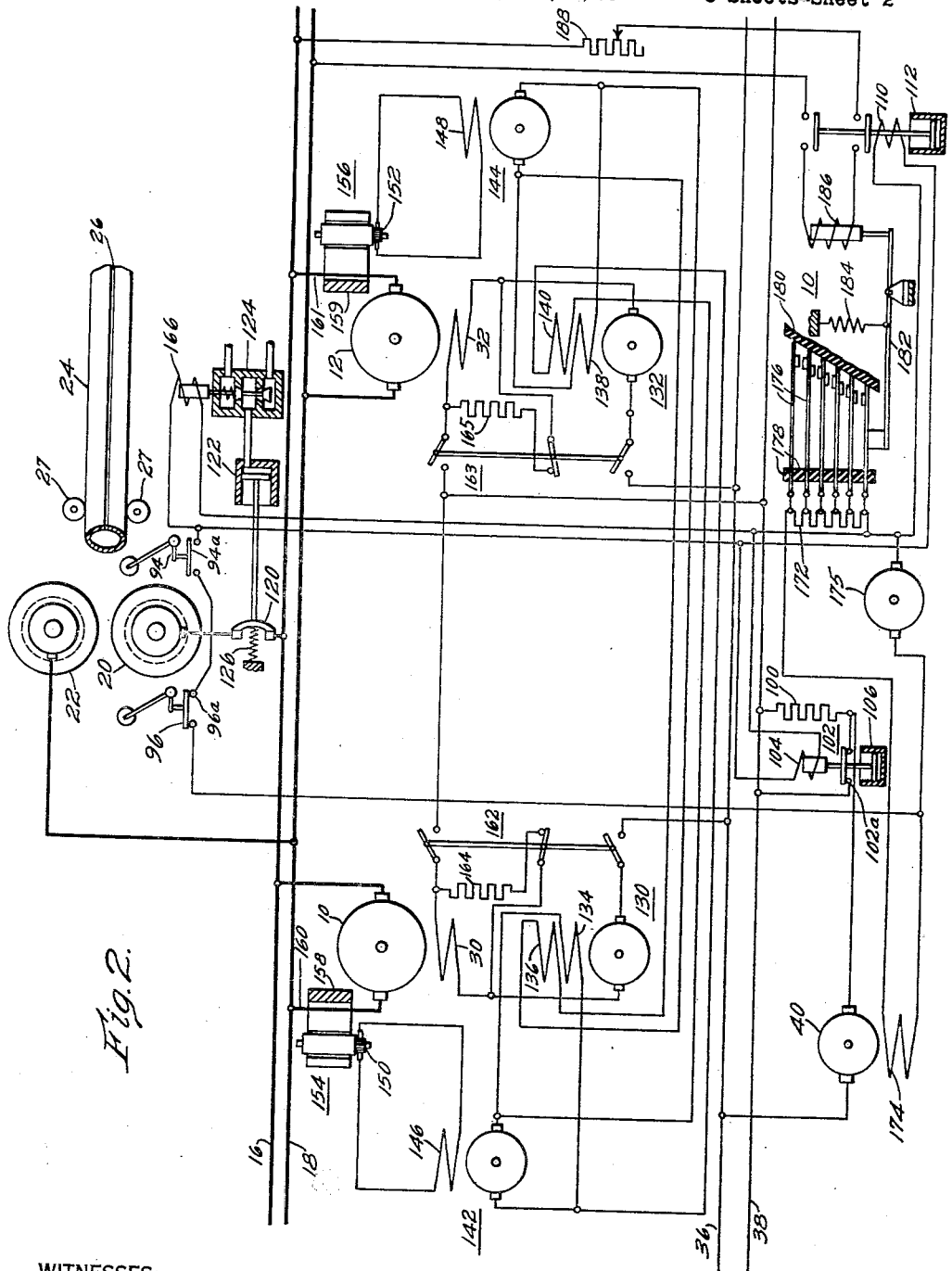

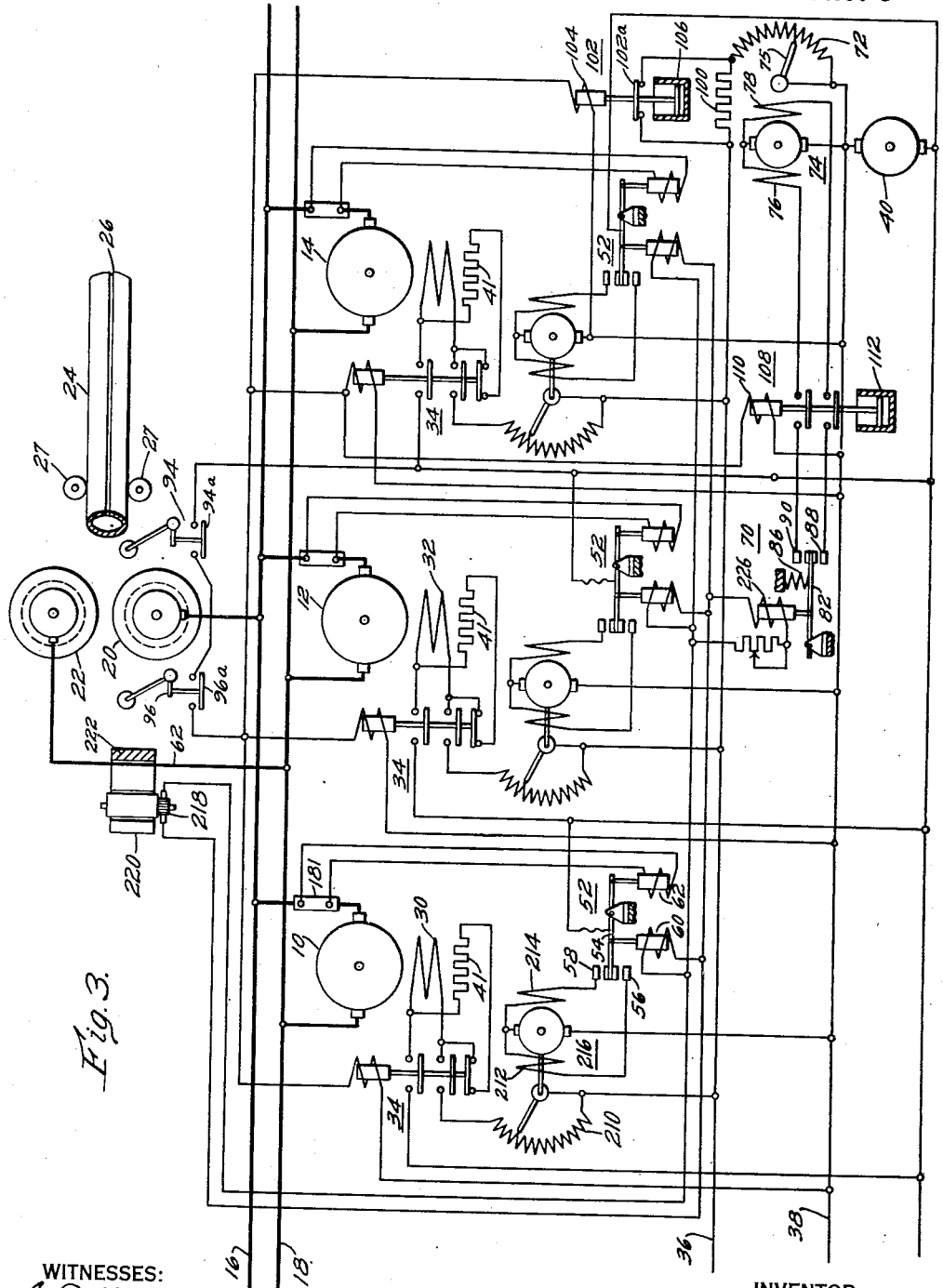

2,235,392

UNITED STATES PATENT OFFICE 2,235,392

WELDING SYSTEM

Ralph H. Wright, Edgewood, Pa., assignor to Westinghouse Electric & Manufacturing Company, East Pittsburgh, Pa., a corporation of Pennsylvania Application March 23, 1939, Serial No. 263,751

13 Claims. (Cl. 219—12)

My invention relates, generally, to welding systems, and more particularly, to direct-current resistance welding systems for welding pipe, conduit and the like.

In the manufacture of pipe and conduit by the resistance welding method, currents of from 40,000 to 200,000 amperes are normally required at a relatively low voltage of from 2 to 7 volts across the electrode members, depending on the size of the pipe and the thickness and nature of the material used. In order to supply direct currents of such magnitude, generators of the homopolar or unipolar type have heretofore been used to some extent, since generators of this type may be built having sufficient capacity to supply the required welding current from a single generator. However, the highly specialized construction of this type of generator makes it relatively expensive to build and maintain. Because of the tremendously strong field required by a generator of this type, it is not possible to maintain accurate control of the welding current by control of the field excitation, the inertia of the field system being so great that, in some instances, it requires from three to four minutes for the field to build up after the field winding has been energized.

Direct-current generators of the commutator type, while adaptable to accurate control of the current output through control of the field excitation thereof, because of the substantially lower inductance of the field circuit, have not as yet been built in sizes having sufficient capacity to supply the entire welding current required in resistance pipe welding operations from a single generator. In order to supply the necessary current capacity, it, therefore, becomes necessary to operate a plurality of such generators in parallel-circuit relation. Inasmuch as the voltage required across the welding electrodes for the resistance welding of pipe is only of the order of from 2 to 7 volts, it will be apparent that where a number of direct-current generators are connected in parallel for supplying the necessary welding current, even normal variations in the internal resistance of the armature, the contact resistance or the brush drop of any one of the generators may result in variations in the terminal voltage of the generator that are relatively large in proportion to the normal terminal voltage, thus causing marked variation in the proportionate loading of the generators. Direct-current generators of the commutator type have been built to supply currents as high as 25,000 amperes, but as it is not practically possible to provide direct-current generators of even 25,000 amperes capacity with series field windings, on account of the physical impossibility of providing such windings for carrying currents of this magnitude, it is not, therefore, possible to use equalizer bus connections for balancing the division of load between a plurality of such generators, so as to overcome the effects of variations in the terminal voltage of the different machines, resulting from such normal changes in their circuit characteristics and permit operation thereof in parallel.

It is, therefore, an object of my invention to provide for controlling a plurality of direct-current generators of the commutator type that are connected for parallel-circuit operation in a resistance welding system so as to maintain a predetermined division of the welding current among the generators.

More specifically, it is an object of my invention to provide a resistance welding system for pipe welding, utilizing a plurality of direct-current generators of the commutator type connected in parallel-circuit relation to supply welding current to the electrode members, and control the excitation of each generator automatically to maintain a predetermined division of the welding current among the generators without the use of series field windings or equalizer bus connections between the generators.

Another object of my invention is to provide in a resistance welding system for controlling, both individually and collectively, a plurality of direct-current generators of the commutator type which are connected in parallel-circuit relation to the electrode members, so as to maintain a predetermined division of the welding current among the generators and maintain a predetermined flow of welding current between the electrode members during a welding operation.

A further object of my invention is to provide for maintaining a predetermined division of welding current among a plurality of relatively low-voltage direct-current generators of the commutator type which are connected for operation in parallel-circuit relation to the electrode members of resistance pipe welding apparatus, and control the excitation of the generators so as to provide a quick response direct-current source for maintaining a predetermined flow of welding current between the electrode members during a welding operation and effect energization of the electrode members in accordance with the movement of the pipe member toward and away from the electrode members.

Other objects will, in part, be obvious, and will, in part, appear hereinafter.

For a complete understanding of the nature and scope of my invention, reference may be had to the following detailed description taken in connection with the accompanying drawings, in which:

Figure 1 is a diagrammatic view of a resistance pipe welding system embodying the principal features of a preferred form of my invention;

Fig. 2 is a diagrammatic view of a resistance pipe welding system embodying an alternate form of my invention; and Fig. 3 illustrates diagrammatically the application of another embodiment of the invention to a resistance pipe welding system.

In practicing a preferred form of my invention, a plurality of direct-current generators of the commutator type are connected for operation in parallel-circuit relation to supply welding current to the electrode members of resistance pipe welding apparatus which engage a pipe member on opposite sides of the seam that is to be welded. A predetermined division of the welding current among the generators is maintained preferably, by individually controlling the excitation of each of the generators in accordance with the differential between the welding current of the individual generator and, either the welding current supplied by another of the generators or the total welding current supplied to the electrode members. The excitation of the generators may furthermore be controlled collectively, so as to maintain a predetermined flow of welding current during the welding operation, and the energization of the electrode members is controlled so as to prevent any burning thereof as the pipe member engages or leaves the electrode members.

Referring particularly to Figure 1, the reference numerals 10 and 12 denote direct-current generators of the commutator type which are connected in parallel-circuit relation to the welding busses 16 and 18 for supplying welding current to the rotatable electrode members 20 and 22, which are positioned for engaging the pipe member 24 on opposite sides of the seam 26 which is to be welded. Movement of the pipe member 24 relative to the electrode members 20 and 22 may be effected in any manner well known in the art of pipe welding, such as, for example, by means of separate drive rolls 27, or by driving the electrode members themselves in any suitable manner.

The generators 10 and 12 may be provided with suitable driving means, such, for example, as a motor 28 which is connected to a suitable source of power by conductors 29.

The generators 10 and 12 are provided with field windings 30 and 32, respectively, which are connected through a control switch 34 to the control busses 36 and 38, which may be energized from any suitable substantially constant potential source, such as the auxiliary generator 40. A field discharge resistor 41 is provided for connection across the field windings 30 and 32 upon de-energization thereof to prevent dangerously high open circuit voltages from being induced therein.

In order to maintain a predetermined division of the welding current between the generators 10 and 12 during a welding operation, a balance resistor 42 may be connected across the field windings 30 and 32 with an adjustable contact arm 44 thereof connected to a common point 45 midway between the field windings. The contact arm 44 may be actuated by a motor 46 having oppositely connected field windings 48 and 50 controlled by a relay 52, so as to actuate the contact arm 44 of the balance resistor to vary the relative amount of resistance shunting the two field windings and thus vary excitation of the field windings 30 and 32 relative to each other, preferably in accordance with the differential between the welding current supplied by each generator.

As illustrated, the relay 52 may be in the form of a balance relay having a pivoted contact arm 54 operable to engage either of the stationary contact members 56 or 58, dependent on the relative energization of the opposed operating windings 60 and 62 thereof. The operating windings 60 and 62 are energized in accordance with the welding current supplied by the generators 10 and 12, being, for example, connected to shunt members 66 and 68, in the load circuits of the generators 10 and 12, respectively.

In order to secure the desired division of welding current between the generators 10 and 12, the relay 52 is connected so that upon a decrease in the welding current supplied by the generator 10, the pull exerted by the operating winding 62 actuates the contact arm 54 of the relay to engage the stationary contact member 58 and effect energization of the field winding 50 and armature of the motor 46 to actuate the movable contact arm 44 of the balance resistor 42 in direction to increase the energization of the field winding 30 of generator 10 and decreasing the energization of the field winding 32 of generator 12, so as to correct any unbalance existing between the welding current supplied by the two generators. It is to be understood that the generators 10 and 12 may carry equal loads or they may divide the total welding current load in any other desired proportion.

In order to maintain a predetermined flow of total welding current during a welding operation, regulating means 70 may be provided, comprising, for example, an adjustable rheostat 72, which is connected in series circuit relation with the field windings 30 and 32 of the generators when the control switch 34 is closed, for collectively controlling the energization thereof. A motor 74, having oppositely connected field windings 76 and 78, the energization of which is controlled by a relay 80, may be utilized for actuating the movable contact arm 75 of the rheostat 72.

The relay 80 may, for example, comprise a pivoted contact arm 82 which is actuated, through energization of an operating winding 84, against the biasing force of a spring 86 to selectively engage the stationary contact members 88 and 90, depending upon whether the potential between the welding busses 16 and 18 is less than or greater than a predetermined value. A variable resistance 92 may be connected in the energizing circuit of the operating winding 84 of the relay 80 for adjusting the relay to maintain different predetermined values of welding current in the welding circuit during the welding operation.

In order to automatically control the energization of the electrode members 20 and 22 so as to prevent the engagement thereof by the pipe member 24 while the electrode members are energized, or the separation therefrom of the pipe member while they are energized, auxiliary switches 94 and 96 may be utilized. These switches may be positioned adjacent the electrode members on opposite sides thereof as shown so as to be actuated by engagement with the pipe member 24 in its passage between the electrode members. By connecting the auxiliary switches 94 and 96 in series-circuit relation, with the operating coil 98 of the control relay 34, the energization of the field windings 30 and 32 may be effected in accordance with the position of the pipe member 24 relative to the electrode members. Whereby the electrode members are energized immediately following the engagement of the pipe member 24 therewith and deenergized immediately prior to its disengagement therefrom.

In order to reduce the time required for the welding generators 10 and 12 to build up their voltage to the desired normal value provision is made for forcing the excitation of their field windings for a predetermined time after the welding operation is commenced. This may be accomplished by the use of a field forcing resistor 100 which is connected in series-circuit relation with the field windings 30 and 32 of the generators and controlled by a field forcing relay 102, the normally-closed contact members 102a thereof being connected to shunt the resistor when the relay is deenergized as shown. The operating winding 104 of the field forcing relay is connected for energization through contact members of the auxiliary switches 94 and 96, so as to be energized upon closure of both of the auxiliary switches. Time delay means, such as the dash pot 106 may be provided for preventing operation of the relay 102 to insert the resistor 100 in the circuit of the field windings 30 and 32 for a predetermined interval of time after actuation of the auxiliary switches 94 and 96, so as to provide for initially increased excitation of the field windings 30 and 32 for a predetermined time. As soon as the relay 102 opens its contact members 102a the resistor 100 is rendered effective to reduce the field excitation of the generators to the normal value as determined by the regulating means 70.

In order to facilitate welding operations when welding relatively short lengths of pipe, an auxiliary relay 108, having an operating winding 110 the energization of which is dependent on the closure of the auxiliary switches 94 and 96, is provided for rendering the regulating means 70 ineffective as soon as the pipe member 24 disengages the auxiliary switch 94, so that the regulating means 70 will not, upon the completion of the passage of a pipe member between the electrode members 20 and 22, continue to attempt to maintain the voltage across the welding bus members 16 and 18 at the closed circuit value maintained during the welding operation.

In order to render the use of the field forcing relay 102 more effective, it is preferable to momentarily retard the operation of the regulating means 70 as a welding operation is commenced, and for this purpose, the auxiliary relay 108 may be provided with time delay means such as the dash pot 112 which functions to retard the closing operation of the relay for a predetermined length of time after energization of the electrode members through closure of the auxiliary switches 94 and 96.

The sequence of operations of the system during a welding operation is as follows:

Upon the engagement of the pipe member 24 with the auxiliary switches 94 and 96, contact members 94a and 96a respectively, are closed, establishing energizing circuits for the operating winding 98 of the control relay 34, the operating winding 104 of the field forcing relay 102, and the operating winding 110 of the auxiliary relay 108 which extend from the control bus 36, through conductor 113, contact members 96a and 94a, conductor 114 and operating windings 98, 104 and 110, in parallel-circuit relation to the bus 38.

Operation of the control relay 34 connects the field windings 30 and 32 of the generators 10 and 12, respectively, to the control busses 36 and 38 through a circuit extending from bus 36, through the rheostat 72, contact members 34b, field winding 30, field winding 32, contact members 34c and the contact members 102a of the field forcing relay 102, to bus 38. This causes the generators 10 and 12 to develop voltage and the electrode members 20 and 22 are thereby energized to effect the desired flow of welding current for welding the pipe seam 26. A predetermined interval of time after the energization of the control relay 34, the field forcing relay 102 operates, opening contact members 102a and inserting the resistor 100 in the field circuit of the generators, thus reducing the energization of their field windings 30 and 32 to a normal value.

The operating coil 110 of the auxiliary relay 108 being also energized, this relay closes after a predetermined time to connect the regulating means 70 to the relay 80 which functions to control the regulating means 70 in accordance with the voltage of the welding busses 16 and 18. Should the voltage across the welding busses 16 and 18 rise above a predetermined value, for example, the operating winding 84 actuates the movable contact arm 82 to engage the stationary contact member 90, thus connecting the armature and field winding 76 of the motor 74 across the busses 36 and 38 to effect actuation of the contact arm 75 of the rheostat 72 in a counterclockwise direction to reduce the energization of the field windings 30 and 32 of the generators and thereby reduce the total welding current to the desired value. Upon a decrease in the voltage across the welding busses 16 and 18, the moving contact arm 82 is actuated in the opposite direction to effect energization of the armature and field winding 78 of the motor 74, and thus increase the excitation of the field windings 30 and 32 so as to increase the welding current the necessary amount.

Should the terminal voltage of the generator 10 vary, relative to the terminal voltage of the generator 12, through any variation in the internal resistance of the armature, the contact resistance of the brushes, or the brush drop, so that the generators 10 and 12 do not divide the total welding current load in the desired proportion, the energization of the operating windings 60 and 62 of the relay 52 varies accordingly. The movable contact arm 54, as a result, is actuated to engage either the stationary contact member 56 or the stationary contact member 58, thus effecting energization of the armature of motor 46 and either the field winding 48 or the field winding 50 from the control busses 36 and 38, so as to actuate the movable contact arm 44 of resistor 42 in either a counterclockwise or a clockwise direction to respectively increase or decrease the energization of the field winding 30 relative to that of the field winding 32, depending on whether the welding current supplied by the generator 10 decreases or increases relative to the welding current supplied by the generator 12. In this manner, the relative energization of the field windings 30 and 32 may be suitably varied in accordance with the existence of any differential between the welding currents supplied by the two generators, so as to immediately correct such unbalance and maintain a predetermined division of the welding current between the generators.

As soon as the pipe member 24 disengages the auxiliary switch 94, the contact members 94a open. The control relay 34 is thereby deenergized, disconnecting the field windings 30 and 32 from the busses 36 and 38, connecting them across the field discharge resistor 41 through contact members 34a. The electrode members 20 and 22 are thereby deenergized in a simple and effective manner, so that there will be no burning of the electrode members or the pipe member through the drawing of any arc as the pipe member leaves the electrode members.

At the same time, the operating winding 110 of the auxiliary relay 108 is deenergized, so that the regulating means 70 is rendered ineffective and the operating winding 104 of the field forcing relay 102 is also deenergized, so that the contact members 102a close, again shunting the resistor 100 to condition the field circuit of the generators for a subsequent energization.

By rendering the regulating means 70 ineffective upon the termination of the welding operation, any tendency of the regulating means to maintain the voltage of the welding busses 16 and 18 at the closed circuit welding value is prevented. The setting of the rheostat 72 is, therefore, retained at a value closely approximating that necessary to provide the value of welding current required during welding, thus conditioning field circuit of the generators for effecting a rapid establishment of the desired flow of welding current upon the entry of another pipe member between the electrode members 20 and 22.

Referring particularly to Fig. 2 of the drawings, which illustrates an alternate form of the invention, the reference numerals 10 and 12, as hereinbefore, denote generally direct-current generators of the commutator type which are connected in parallel-circuit relation to the welding busses 16 and 18, respectively, for supplying welding current to the electrode members 20 and 22, which by means of a circuit breaker 120, which is in this instance, actuated by fluid pressure means 122 under the control of a solenoid operated fluid pressure valve 124, against the force of a spring 126, which normally biases the circuit breaker to the open position. The generators may be driven in any suitable manner, such, for example, as shown in Fig. 1.

In this embodiment of the invention, the field windings 30 and 32 of the generators 10 and 12, respectively, are connected for energization to the control busses 36 and 38, and control exciters 130 and 132 are, respectively, connected in series relation therewith for individually varying the energization of the respective field windings from the control busses in accordance with variations in the division of the welding current between the generators. The control exciters 130 and 132 are preferably provided with differentially connected field windings 134 and 136, and 138 and 140, respectively.

As will be readily understood the control exciters 130 and 132 may be operated in any one of three different ways. They may be operated in such manner as to develop zero voltage when their associated welding generators are dividing the total load in a predetermined desired manner in which event they would function to either "buck" or "boost" the voltage of the control busses 36 and 38 depending upon the load variation of their associated generators.

The control exciters may be also operated as bucking generators or as booster generators. When they are operated as bucking generators they function to buck the voltage of the control busses 36 and 38 at all times in varying degrees dependent upon the load variation of their associated generators and when they are operated as booster generators they function in the opposite manner to boost the voltage of the control busses 36 and 38 in varying degrees dependent upon the load variation of their associated generators. In this instance, however, it will be assumed that the control exciters function in the manner first described wherein they develop zero voltage when their associated generators are driving the total welding load in a predetermined desired manner.

Pilot exciters 142 and 144 are provided for controlling the excitation of the field windings of the control exciters, in accordance with the load currents of the generators, having field windings 146 and 148, which are energized in accordance with the welding current supplied by the generators 10 and 12, respectively. The field windings 146 and 148 of the pilot exciters may be energized in any suitable manner. In this instance they are connected to the armatures 150 and 152 of dynamo-electric machines 154 and 156, the field members 158 and 159 of which comprise substantially U-shaped frame members which are looped about the portions 160 and 161 of the main busses of the generators 10 and 12, so that magnetic fluxes are induced therein proportional to the values of the welding currents supplied by the generators. By connecting the armatures 150 and 152 of the dynamo-electric machines 154 and 156 to suitable driving means (not shown) so as to drive them at a substantially constant speed, the field windings 146 and 148 of the pilot exciters 142 and 144 may be energized in accordance with the current supplied by the generators 10 and 12, respectively.

The differential field winding 134 of the control exciter 130 and the cumulative field winding 140 of the control exciter 132 are connected to be energized from the pilot exciter 142, while the differential field winding 138 of the control exciter 132 and the cumulative field winding 136 of the control exciter 130 are connected for energization from the pilot exciter 144.

Switches 162 and 163 may be provided for disconnecting the field windings 30 and 32 of the generators 10 and 12 from the control busses when desired, and connecting the field discharge resistors 164 and 165 across the field windings to prevent the building up of high open circuit voltages in the field windings upon disconnection from the control busses.

The auxiliary switches 94 and 96 are, as in the welding system shown in Fig. 1, utilized for controlling the energization of the electrode members 20 and 22 in accordance with the movement of the pipe member 24 relative to the electrode members. The energization of the operating winding 166 of the solenoid-operated valve 124 may be controlled by the auxiliary switches 94 and 96 to effect closure thereof only when both switches are closed, and effect the opening thereof as soon as the switch 94 opens.

To control the flow of welding current during a welding operation, regulating means 70 may be provided for controlling the voltage across the control busses 36 and 38. As illustrated, a tapped resistance 172 is connected in series circuit relation with the field winding 174 of the generator 40 which energizes the control busses 36 and 38, the winding 174 being, for example, connected for energization to any suitable source such as the generator 175. A plurality of relatively thin resilient contact members 176 are assembled in normally spaced relation by insulating means 178 adjacent to one end. These ends of the contact members 176 are respectively connected to different taps of the resistance 172, while the other ends are supported in normally spaced relation by an insulating support member 180. Control means, comprising a pivoted operating arm 182 biased by a spring 184 to normally engage and flex the contact members 176, is provided for forcing the normally spaced ends of contact members 176 together, so as to shunt out the tapped sections of the resistor 172 which are connected therebetween. By connecting the operating winding 186 of the control means across the welding busses 16 and 18 in series circuit relation with an adjustable resistance 188, the operating winding 186 may be energized in accordance with the voltage existing across the welding busses 16 and 18 to effect actuation of the operating arm 182 against the force of the spring 184 so as to effect separation of the leaf members 176 and insert sections of the resistance 172 into the field circuit of the generator 40, thus controlling the energization of the field windings 30 and 32, so as to maintain different predetermined values of welding current during a welding operation. An auxiliary relay 108 is provided for rendering the regulating means ineffective between successive welding operations and a field forcing relay 102 is provided for effecting an increase in the excitation of the field windings 30 and 32 upon the commencement of a welding operation.

By providing the control exciters 130 and 132 of the generators 10 and 12, respectively, with the differential and cumulative field windings connected in the manner hereinbefore described, it will be understood that upon any decrease or increase in the load of one generator relative to the other, the excitation of the field winding of the pilot exciter associated with that generator will accordingly be varied so as to effect changes in the excitation of the control exciters of the generators 10 and 12, to immediately compensate for any such change in the division of the welding current and reestablish the balance of the load between the generators.

The operating sequence of the welding system illustrated in Fig. 2 is similar to that of the welding system of Fig. 1, which was hereinbefore described in detail. The energization of the electrode members 20 and 22 is controlled in accordance with the passage of the pipe member 24 relative to the electrode members by the auxiliary switches 94 and 96 controlling the operation of the circuit breaker 128. The operations of the field forcing relay 102, the auxiliary relay 108 and the regulating means 70 are substantially the same as described in connection with Fig. 1.

When any unbalance occurs between the welding current supplied by the generators 10 and 12, the excitation of the field windings 146 and 148 of the pilot exciters is affected accordingly through the corresponding change in the excitation of the dynamo electric machines 154 and 156. The energization of the cumulative and differential windings of the control exciters 130 and 132 is thereby varied so as to regulate the relative energization of the field windings 30 and 32 of the generators to correct the unbalance. For example, suppose that because of variations in the armature resistance, contact resistance, or brush drop, the output of the generator 10 should decrease: The voltage generated by the dynamo electric machine 154 would likewise decrease because of the reduced current in the generator bus portion 160. The energization of the differential field winding 134 of the control exciter 130 and the cumulative field winding 140 of the control exciter 132 is accordingly decreased.

Under the assumed condition of operation of the control exciters this causes the control exciter 130 to develop a voltage which is cumulative with respect to the voltage of the control busses 36 and 38 and thereby increases the excitation of the generator 10 and the control exciter 132 to develop a voltage which is differential with respect to the voltage of the control busses 36 and 38 to decrease the excitation of the other generator 12, which has assumed more than its share of the total load.

Under these same conditions the total welding load remaining substantially constant, the pilot exciter 144, associated with the generator 12, increases its voltage due to the excess load assumed by generator 12 and increases the energization of the differential field winding 138 of the control exciter 132 of generator 12 which further increases the differential voltage developed by the exciter 132. Since the cumulative field winding of the control exciter 130 is connected to the pilot exciter 144 its energization is likewise increased which further increases the cumulative voltage developed by the control exciter 130.

Thus it will be apparent that the terminal voltage of generator 10 is increased not only as the result of its reduced load but also as the result of the increased load on the other generator 12. Likewise the terminal voltage of the generator 12 is reduced in accordance with its increased load and the decreased load of generator 10. This results in the restoration of the desired load division or balance between the generators.

Referring particularly to Fig. 3, the reference numerals 10, 12 and 14 denote, respectively, generators of the commutator type which are connected for operation in parallel-circuit relation to energize the welding busses 16 and 18 which supply welding current to the electrode members 20 and 22, and are provided with field windings 30, 32 and 33, respectively. The generators 10, 12 and 14 may be driven in any suitable manner, such, for example, as shown in Fig. 1. Inasmuch as the load and control circuits, and the operation of the three generators is the same, the following description is limited to the generator 10, and circuits and operation of the other generators may readily be understood therefrom.

The field winding 30 of the generator may be connected for energization across the control busses 36 and 38 which are energized from the source 40. In order to control the excitation of the field winding 30 so that the generator 10 will supply a predetermined portion of the total welding current, a rheostat 210 is connected in series circuit relation with the field winding 30, and the energization of armature and the oppositely connected field windings 212 and 214 of the operating motor 216 thereof controlled by means of the relay 52.

As explained in connection with Fig. 1, the relay 52 may comprise a pivoted contact arm 54 having oppositely acting operating windings 60 and 62 for urging the contact arm to engage the stationary contact members 56 and 58, respectively. The operating winding 62 is energized in accordance with the welding current supplied by the generator 10, being, for example, connected across a shunt member 181 in the main circuit of the generator. The operating winding 60 is energized in accordance with the total welding current, and may be connected to a shunt member in the main welding circuit, or, as illustrated, across the armature 218 of a dynamo-electric machine 220, having a field structure 222 which comprises a substantially U-shaped member disposed in looped relation about the main welding bus in the manner hereinbefore described in connection with Fig. 2. By thus connecting the opposed operating windings 60 and 62 of the relay 52 to be energized respectively in accordance with the total welding current and with the welding current supplied by the generator 10, energization of the field winding 30 of the generator 10 may be controlled so as to maintain a predetermined relation between these two values of welding current. By similarly controlling the excitation of the generators 12 and 14, a predetermined division of the total welding current may be maintained among the generators.

The total welding current may be maintained at any predetermined suitable value by regulating means 70, which functions to control the energization of the control busses 36 and 38 to which the field windings of all the generators are connected. The operating coil 226 of the regulating means is connected across the armature 218 of the dynamo-electric machine 220 for energization in accordance with the total welding current, so as to control the energization of the oppositely connected field windings 76 and 78 of the rheostat-actuating motor 74 to vary the energization of the control bus members 36 and 38 from the source 40, as hereinbefore described in detail in connection with Fig. 1.

The energization of the electrode members 20 and 22 may, as hereinbefore described in connection with the welding system illustrated in Fig. 1, be controlled by controlling the energization of the field windings of the generators through control relays 34, which also control the connection of the field discharge resistor 41 across the field windings upon disconnection from the source 40. Likewise, the field forcing relay 102 and the auxiliary relay 108 function in the same manner set forth in connection with the system of Fig. 1 of the drawings.

From the above-detailed description, taken in connection with the accompanying drawings, it will be understood that I have provided for controlling the division of the welding current between a plurality of direct-current generators of the commutator type which are connected for operation in parallel-circuit relation to supply welding current for a pipe welding operation at a relatively low voltage of the order of from 2 to 7 volts across the electrode members.

By utilizing the embodiments of my invention hereinbefore described and shown, it is possible to utilize direct-current generators of the commutator type for supplying direct current of large enough values for the resistance welding of pipe, and accurately control the division of the welding current among the generators without requiring the use of equalizer bus connections, which cannot be used with series windings of any sort on the generators or generators of the capacity required in pipe welding applications because of the enormously large conductors necessary to carry the required welding currents.

By controlling the field excitation of the generators collectively and individually in the manner hereinbefore described, it is possible to utilize the quick-response field characteristics of generators of the commutator type, and thus provide a resistance pipe welding system for maintaining accurate control of the welding current without requiring the use of highly specialized and expensive control apparatus.

Since certain changes may be made in the above description, and different embodiments of the invention may be made without departing from the spirit thereof, it is intended that all the matter contained in the above description and shown in the accompanying drawings shall be considered as illustrative, and not in a limiting sense.

I claim as my invention:

1. A power system comprising, a plurality of generators of relatively low terminal voltage connected in parallel circuit relation for supplying current to a work circuit, means for automatically controlling the excitation of each generator to maintain a predetermined division of the load current among the generators, and additional means for controlling the excitation of the generators independently of the aforesaid means to maintain a predetermined flow of load current.

2. The combination in a power system for supplying electrical energy to a work circuit, of a plurality of low voltage direct-current generators connected in parallel-circuit relation for supplying current to the work circuit, means for differentially controlling the excitation of each generator to maintain a predetermined division of the load current among the generators, and means for continuously controlling the excitation of the generators under load conditions to maintain a predetermined load current.

3. The combination in a power system for energizing a load circuit, of a plurality of relatively low-voltage direct-current generators connected in parallel-circuit relation for energizing the load circuit, regulating means operable to control the excitation of the generators collectively to regulate the flow of load current, independently operable means for differentially controlling the excitation of each generator so as to divide the load current between the generators according to a predetermined ratio, control switch means operable to effect over-energization of the load circuit from the generators, relay means responsive a predetermined time after operation of the control switch means to reduce the excitation of the generators to effect substantially normal energization of the load circuit, and time delay means responsive to the energization of the load circuit operable a predetermined time after operation of the control switch means to effect operation of the regulating means.

4. In a power system the combination, of a plurality of low-voltage direct-current generators connected in parallel-circuit relation for supplying current to a work circuit, said generators each having a field winding for controlling the terminal voltage thereof, switch means operable to effect greater than normal excitation of the field windings, relay means responsive a predetermined interval of time after the operation of the switch means to reduce the excitation of the field windings to substantially normal, means for individually controlling the energization of each field winding in accordance with the relation between the current supplied by its associated generator and the current supplied by another of the generators, and additional means rendered effective by said relay means for controlling the energization of the field windings to maintain a predetermined division of the current among the generators to control the total current supplied to the work circuit.

5. The combination in a power system, a pair of relatively large direct-current generators of the commutator type connected in parallel-circuit relation for supplying current to a load circuit, a field winding for each generator, means for simultaneously varying the energization of the field windings in opposite senses, relay means responsive to the relation between the current supplied by one of the said generators and the current supplied by another of the generators for controlling the said means and means operable independently of the first mentioned means for collectively controlling the energization of both of the field windings simultaneously in the same sense to control the total current supplied to the load circuit.

6. A power system for supplying current to a load circuit comprising, a plurality of low-voltage direct current generators connected to the load circuit for operation in parallel circuit relation, a field winding for each generator connected to a source of variable voltage, a pilot exciter for each generator having a field winding connected so as to be energized in accordance with the current supplied to the load circuit by its associated generator, an exciter for controlling the energization of each field winding, said exciter having differentially related field excitation windings, means connecting one of said field excitation windings of an exciter to the pilot exciter of its associated generator, and means connecting the other of said field windings of said exciter to the pilot exciter of another of the generators.

7. A power system for supplying current to a load circuit comprising, a plurality of relatively low voltage direct-current generators of the commutator type connected in parallel-circuit relation for applying a relatively low voltage to the load circuit, a field winding for each generator, means for effecting energization of each field winding in accordance with the differential between the current supplied by the generator with which said field winding is associated and the total current so as to maintain a predetermined division of the current between the generators, switch means operable to effect greater than normal energization of said field windings, and time delay means responsive a predetermined interval of time after the operation of the switch means to reduce the energization of the field windings to substantially normal.

8. A power system for supplying electrical energy to a load circuit comprising, a plurality of relatively low voltage direct-current generators of the commutator type connected in parallel-circuit relation to effect the energization of the load circuit, a field winding for each generator, means for controlling the energization of each field winding in accordance with the relation between the current supplied by its associated generator and the current supplied by another of said generators, switch means operable for effecting greater than normal energization of the load circuit, regulating means for maintaining a predetermined flow of current, relay means controlled by the switch means for effecting a reduction in the energization of the load circuit after a predetermined interval of time, and time delay means for preventing the operation of the regulating means for a predetermined interval of time after energization of the load circuit.

9. The combination in a power system, of a plurality of direct current generators of the commutator type connected in parallel-circuit relation, a field winding for each generator, a source of energization for the field windings, means for individually controlling the energization of the field windings of each of the generators in accordance with the relation between the current of each generator and the current supplied by all of the generators, switch means operable to effect greater than normal energization of the field windings, relay means for effecting substantially normal energization of the field windings of the generators a predetermined interval of time after the operation of the switch means, regulating means for independently controlling the energization of the field windings of the generators to control the current, and additional relay means for rendering the regulating means ineffective for a predetermined length of time after operation of the switch means.

10. The combination with resistance welding apparatus having rotatable electrodes for progressively engaging a pipe member which is to be welded, of a plurality of relatively low voltage direct current generators connected in parallel circuit relation for supplying current to the electrodes, means for differentially controlling the output of the generators to maintain a predetermined division of the current among the generators, regulating means operable independently of said means for controlling the output of the generators to maintain a predetermined flow of current between the electrodes, switch means operable to effect over-excitation of the generators, time delay means for reducing the excitation of the generators to substantially normal a predetermined time after energization, and means responsive to the movement of the pipe member for effecting operation of the regulating means a predetermined period after the initiation of a welding operation, and effecting the energization of the time delay means.

11. The combination with a work circuit having work engaging members for supplying relatively heavy currents to the work, of a plurality of relatively low voltage direct current generators connected in parallel circuit relation for supplying current to the work engaging members, a field winding for each generator energizable from a source of variable voltage power, switch means energizable to connect the said field winding to the source for greater than normal excitation, control means operable to vary the voltage of said source to maintain a predetermined flow of current in the work circuit, relay means operable a predetermined time after energization to reduce the excitation of the field winding, additional relay means energizable for effecting the operation of the control means after a predetermined period, control switch means actuated by the work to effect the energization of the said switch and relay means, and means for differentially controlling the energization of the field windings to maintain a predetermined current balance among the generators.

12. The combination in a power system for supplying electrical energy to a load circuit, of a plurality of relatively low voltage direct current commutator type generators connected in parallel circuit relation for supplying a relatively heavy current to the load circuit, a field winding for each generator, a variable voltage source of power for energizing said field windings, means for continuously controlling the voltage of the source after a predetermined period subsequent to the energization of the load circuit to maintain a predetermined flow of load current, means including a series exciter for varying the excitation of each field winding, and means for differentially controlling the excitation of each series exciter in accordance with the currents supplied by its associated generator and another of the generators to maintain a predetermined division of the load current among the generators.

13. The combination with a work circuit for supplying current to work engaging members, of a pair of relatively low voltage direct current generators connected in parallel circuit relation for supplying a relatively large current to the work circuit, a field winding for each of the generators disposed to be initially over-excited, means responsive to the current supplied by each of the generators for differentially varying the excitation of the field windings of the generators to maintain a predetermined current division therebetween, and control means operable independently of the said means to vary the excitation of the generator field windings so as to maintain a predetermined current flow in the work circuit, relay means operable a predetermined time after energization to reduce the excitation of the field windings, switch means operable a predetermined time after energization to effect the operation of the control means, and control switch means positioned adjacent the work engaging members actuable by the work to energize the said relay means and switch means.

RALPH H. WRIGHT.